(12) United States Patent
Kobayashi

(10) Patent No.: US 11,807,000 B2
(45) Date of Patent: Nov. 7, 2023

(54) PRINTING APPARATUS, CONTROL METHOD, AND STORAGE MEDIUM

(71) Applicant: CANON KABUSHIKI KAISHA, Tokyo (JP)

(72) Inventor: Daisuke Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 17/557,854

(22) Filed: Dec. 21, 2021

(65) Prior Publication Data

US 2022/0203678 A1 Jun. 30, 2022

(30) Foreign Application Priority Data

Dec. 25, 2020 (JP) ................. 2020-217085

(51) Int. Cl.
*B41J 2/045* (2006.01)

(52) U.S. Cl.
CPC ......... *B41J 2/04551* (2013.01); *B41J 2/0458* (2013.01); *B41J 2/04581* (2013.01)

(58) Field of Classification Search
CPC ............................ B41J 19/145; G06K 15/107
See application file for complete search history.

(56) References Cited

FOREIGN PATENT DOCUMENTS

JP 2006-7759 A 1/2006
JP 2015174219 A * 10/2015 ............ B41J 2/2054

* cited by examiner

*Primary Examiner* — Julian D Huffman
(74) *Attorney, Agent, or Firm* — VENABLE LLP

(57) ABSTRACT

One of printing modes including a first mode in which printing is performed by an even number of scans and a second mode in which printing is performed by an odd number of scans, the odd number being three or more, is executed. In the first mode, printing is performed using a first mask pattern in which the nozzle array is divided into a plurality of blocks each including a first number of continuous nozzles and an ink ejection area or non-ejection area is set for each of the blocks. In the second mode, printing is performed using a second mask pattern in which the nozzle array is divided into a plurality of blocks each including a second number of continuous nozzles, the second number being less than the first number, and an ink ejection area or non-ejection area is set for each of the blocks.

16 Claims, 11 Drawing Sheets

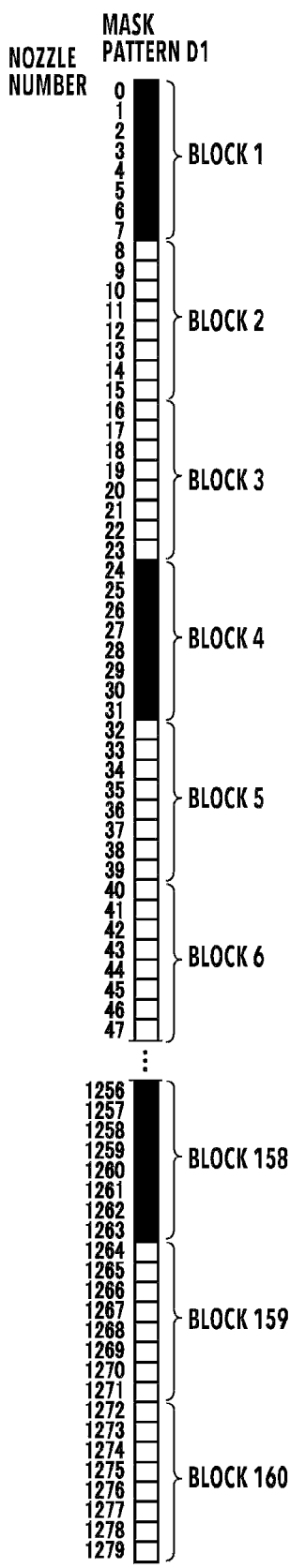   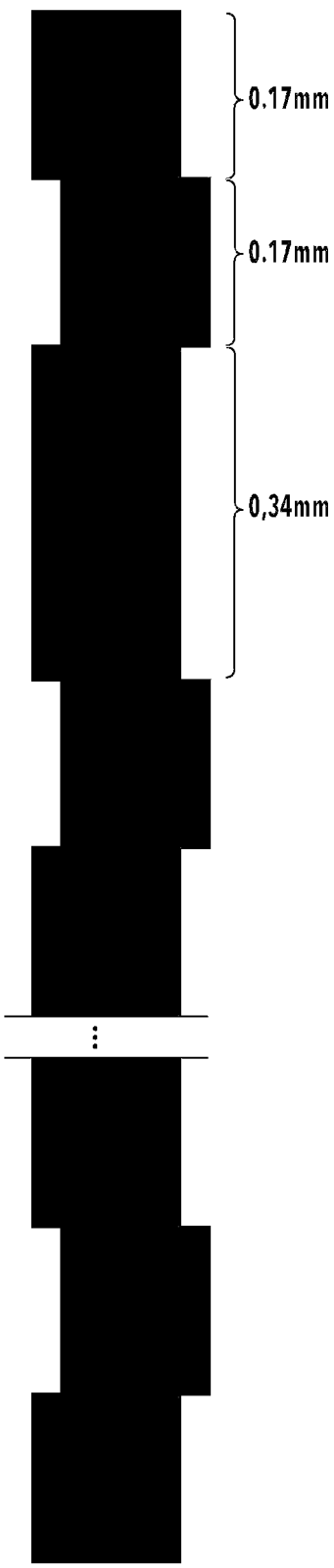
FIG.8A FIG.8B FIG.8C FIG.8D

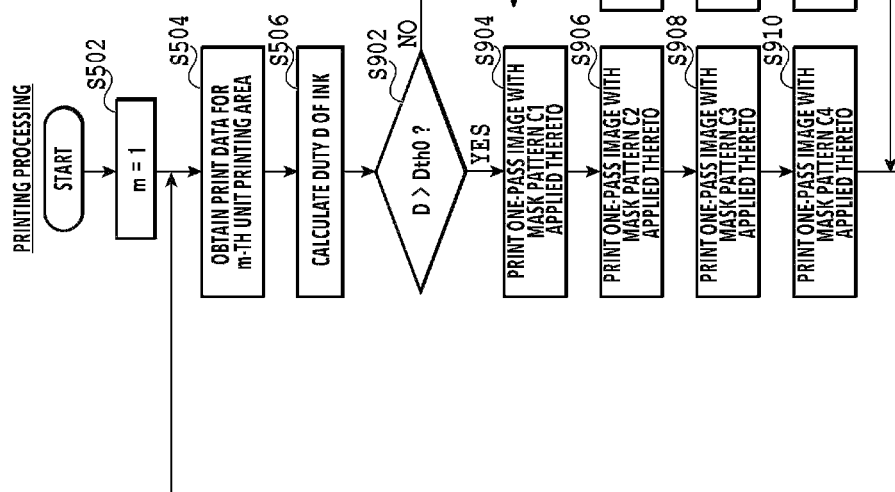

PRINTING APPARATUS, CONTROL METHOD, AND STORAGE MEDIUM

BACKGROUND OF THE INVENTION

Field of the Invention

The present invention relates to a printing apparatus which ejects ink to a printing medium and performs printing, a control method of the printing apparatus, and a storage medium.

Description of the Related Art

As a control method of printing in an inkjet printing apparatus, there is known divisional control by which the number of scans (number of passes) accompanied with printing by a print head in a unit printing area of a printing medium is changed according to an image to be printed. In the divisional control, in the case of printing a high duty image requiring printing of about 30 to 50% or more of the number of pixels printable on a printing medium, printing is performed with the number of passes greater than that in the case of printing an image other than the high duty image.

Japanese Patent Laid-Open No. 2006-7759 shows nozzle positions used for printing in a single scan by divisional control. Specifically, in the case of printing a unit printing area by M passes, a nozzle array extending in a direction orthogonal to a scan direction of a print head is divided into blocks of a predetermined number of nozzles and blocks used for printing are allocated to each scan accompanied with printing. More specifically, blocks 1, M+1, 2M+1 . . . are used for printing in the first scan, blocks 2, M+2, 2M+2 . . . are used for printing in the second scan, and blocks J, M+J, 2M+J . . . are used for printing in the J-th scan.

In order to reduce a printing time in divisional control, for example, in a serial inkjet printing apparatus, printing is performed in both forward and backward scans by a print head which reciprocally moves in a scan direction. However, in the case of bidirectional printing including forward printing and backward printing, there is a possibility of misalignment between ink landing positions in the forward printing and those in the backward printing. In the case of an even number of passes, if there is misalignment between ink landing positions in the forward direction and those in the backward direction, portions printed by adjacent blocks (nozzle groups) are definitely misaligned in the scan direction. On the other hand, in the case of an odd number of passes, some of the portions printed by the adjacent blocks are misaligned in the scan direction and the others are not misaligned in the scan direction.

In a case where the same block width (number of nozzles) is used for an odd number of passes and an even number of passes, an image defect caused by misalignment between ink landing positions is difficult to see if the misalignment occurs in the same width like an image printed with an even number of passes. In contrast, an image defect caused by misalignment between ink landing positions is easy to see if the misalignment occurs in different widths like an image printed with an odd number of passes. However, Japanese Patent Laid-Open No. 2006-7759 has no mention of such an image defect caused by misalignment between ink landing positions conspicuous in printing by an odd number of passes.

SUMMARY OF THE INVENTION

The present invention has been accomplished in view of the above problem and provides a technique capable of suppressing the occurrence of an image defect caused by ink landing positions in the case of printing by an odd number of passes in a printing apparatus which alternately performs a forward scan accompanied with printing and a backward scan accompanied with printing.

In the first aspect of the present invention, there is provided a printing apparatus comprising:

a printing unit having a nozzle array in which a plurality of nozzles ejecting ink to a printing medium are arrayed, the printing unit being configured to perform printing while performing a scan in a direction crossing an array direction of the nozzle array; and a control unit configured to control the printing unit such that the printing unit alternately executes a forward scan accompanied with printing in a scan direction of the printing unit and a backward scan accompanied with printing in the scan direction to print a unit printing area corresponding to a length of the nozzle array in the array direction printable by a single scan by the printing unit, wherein the control unit selectively executes one of printing modes including a first mode in which the unit printing area is printed by an even number of scans accompanied with printing and a second mode in which the unit printing area is printed by an odd number of scans accompanied with printing, the odd number being three or more, in the first mode, printing is performed using a first mask pattern in which the nozzle array is divided into a plurality of blocks each including a first number of continuous nozzles, the number of blocks being greater than the even number, and an ink ejection area or non-ejection area is set for each of the blocks, and in the second mode, printing is performed using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

In the second aspect of the present invention, there is provided a control method of a printing apparatus, the control method comprising:

selectively executing one of printing modes including a first mode and a second mode, the first mode being a mode in which a unit printing area is printed by an even number of scans accompanied with printing by a printing unit, the printing unit having a nozzle array in which a plurality of nozzles ejecting ink are arrayed, the printing unit being configured to alternately execute an operation of printing while performing a forward scan in a scan direction crossing an array direction of the nozzle array and an operation of printing while performing a backward scan in the scan direction to print the unit printing area corresponding to a length of the nozzle array in the array direction printable by a single scan, the second mode being a mode in which the unit printing area is printed by an odd number of scans accompanied with printing by the printing unit, the odd number being three or more;

in the first mode, performing printing using a first mask pattern in which the nozzle array is divided into a plurality of blocks each including a first number of continuous nozzles, the number of blocks being greater than the even number, and an ink ejection area or non-ejection area is set for each of the blocks; and in the second mode, performing printing using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

In the third aspect of the present invention, there is provided a non-transitory computer readable storage medium storing a program for causing a computer to perform a control method of a printing apparatus, the control method comprising:

selectively executing one of printing modes including a first mode and a second mode, the first mode being a mode in which a unit printing area is printed by an even number of scans accompanied with printing by a printing unit, the printing unit having a nozzle array in which a plurality of nozzles ejecting ink are arrayed, the printing unit being configured to alternately execute an operation of printing while performing a forward scan in a scan direction crossing an array direction of the nozzle array and an operation of printing while performing a backward scan in the scan direction to print the unit printing area corresponding to a length of the nozzle array in the array direction printable by a single scan, the second mode being a mode in which the unit printing area is printed by an odd number of scans accompanied with printing by the printing unit, the odd number being three or more;

in the first mode, performing printing using a first mask pattern in which the nozzle array is divided into a plurality of blocks each including a first number of continuous nozzles, the number of blocks being greater than the even number, and an ink ejection area or non-ejection area is set for each of the blocks; and in the second mode, performing printing using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

According to the present invention, in a printing apparatus which alternately performs a forward scan accompanied with printing and a backward scan accompanied with printing, the occurrence of an image defect caused by misalignment between ink landing positions in the case of printing by an odd number of passes can be suppressed.

Further features of the present invention will become apparent from the following description of exemplary embodiments with reference to the attached drawings.

BRIEF DESCRIPTION OF THE DRAWINGS

FIGS. 8A to 8D are diagrams showing mask patterns used for three-pass printing and a printed image as a comparative example;

FIG. 9 is a diagram showing a relation between FIGS. 9A and 9B;

FIGS. 9A and 9B are flowcharts showing detailed processing contents of printing processing.

DESCRIPTION OF THE EMBODIMENTS

An example of embodiments of a printing apparatus, a control method, and a storage medium will be described below in detail with reference to the accompanying drawings. The embodiments described below do not limit the present invention and not all combinations of the features described in the embodiments are necessarily essential in solving the problem of the present invention. Further, the relative positions, shapes, and the like of the features described in the embodiments are only shown as examples and the scope of the invention is not limited to these examples.

First Embodiment

Figure 1A:
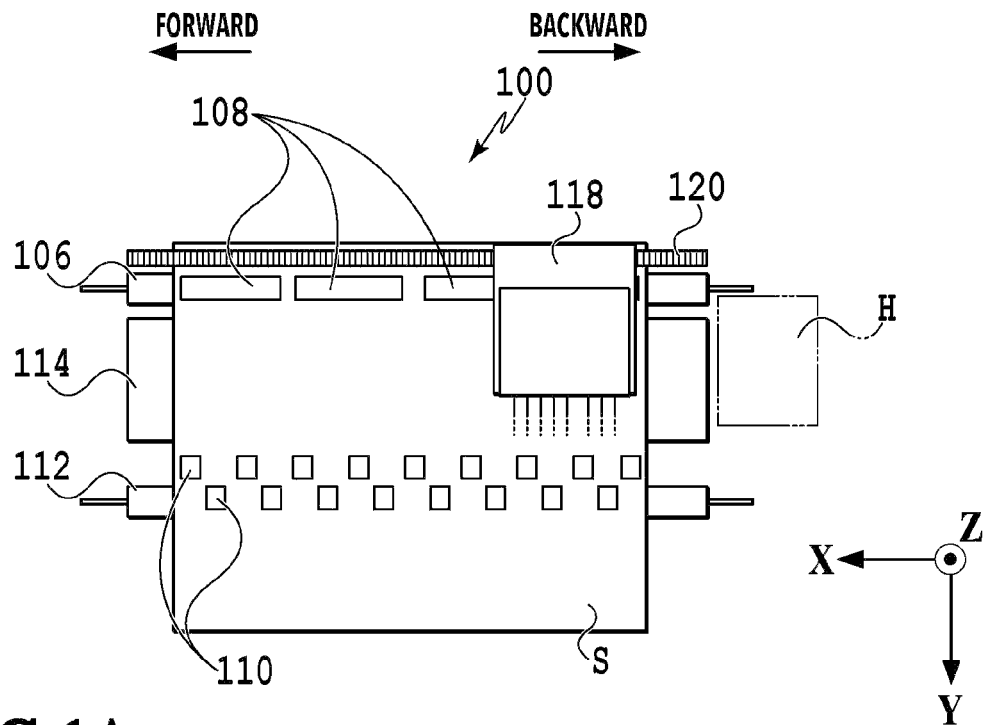
FIGS. 1A and 1B are configuration diagrams of a printing apparatus.
Figure 1B:
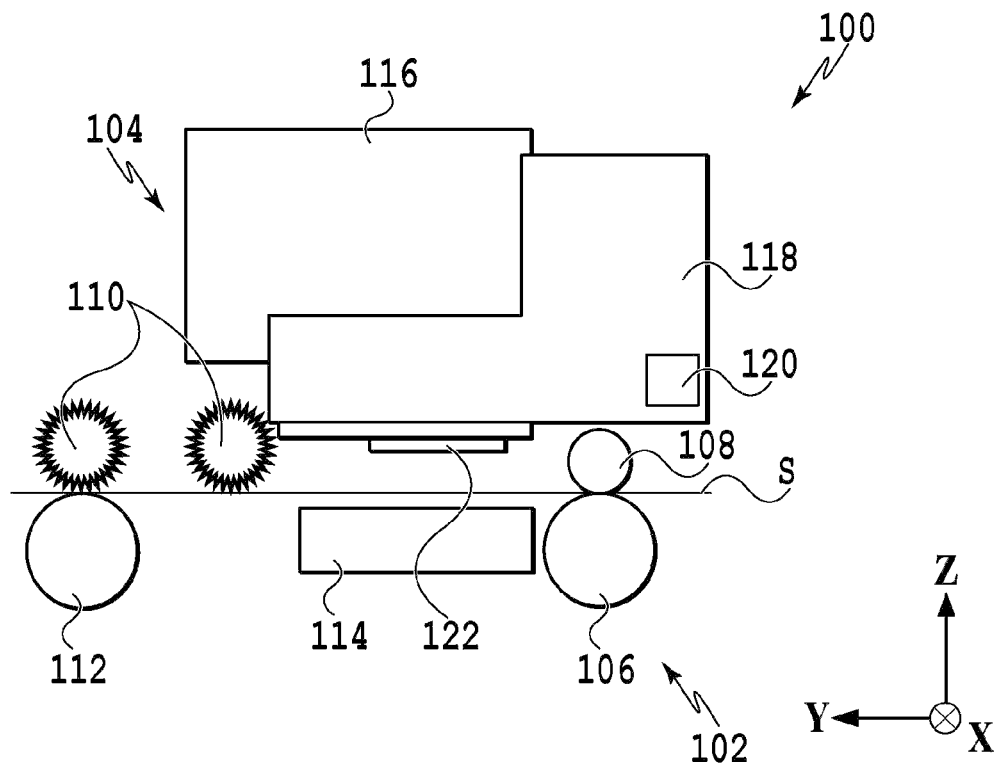

First, a printing apparatus according to a first embodiment will be described with reference to FIG. 1A to 8D. FIG. 1A is a schematic configuration diagram of the printing apparatus according to the embodiment. FIG. 1B is a side view of the printing apparatus. A printing apparatus 100 shown in FIGS. 1A and 1B is an inkjet printing apparatus which ejects ink to a printing medium S in sheet form and performs printing using an inkjet system.

The printing apparatus 100 comprises a conveying portion 102 which conveys a printing medium S and a printing portion 104 which performs printing on a conveyed printing medium S. The conveying portion 102 comprises a conveying roller 106 extending in a width direction (X direction) of a conveyed printing medium S and a pinch roller 108 in pressure contact with the conveying roller 106 to follow the conveying roller 106. A printing medium S is pinched between the conveying roller 106 and the pinch roller 108 and conveyed in a Y direction crossing (in the present embodiment, orthogonal to) the X direction. The conveying portion 102 also comprises a spur 110 which holds a printing medium S conveyed by the conveying roller 106 and a discharging roller 112 which discharges a printing medium S held by the spur 110. That is, in the conveying portion 102, the conveying roller 106 and the pinch roller 108 are located upstream of the spur 110 and the discharging roller 112 in a conveying direction of a printing medium S.

The printing portion 104 comprises a platen 114 which supports a conveyed printing medium S between the conveying roller 106 and the discharging roller 112 and a print head 116 equipped with a printing chip 122 (described later) facing the platen 114. The print head 116 is configured to move reciprocally in the X direction through a carriage 118. That is, in the present embodiment, the X direction is a scan direction in which the print head 116 performs a scan and the print head 116 is configured to move forward from one side to the other side in the scan direction and move backward from the other side to one side in the scan direction. The carriage 118 is connected to a belt 120 and configured to move by this belt 120. The print head 116 is located in a home position H provided at one end in the X direction in a case where printing is not performed or recovery processing is performed for the print head 116.

In the present embodiment, the printing apparatus 100 is configured to eject ink from the print head 116 which moves (performs a scan) in the X direction with respect to a printing medium S conveyed in the Y direction. However, the configuration is not limited to this. That is, the print head and the printing medium S only have to move relatively in a direction crossing an array direction of nozzles and either of them may be fixed.

The print head 116 is supplied with ink from an ink tank (not shown) storing ink through a tube (not shown). In the present embodiment, for example, the print head 116 is configured to eject black (Bk) ink, cyan (C) ink, magenta (M) ink, and yellow (Y) ink. The print head 116 also comprises the printing chip 122 provided in a position corresponding to the platen 114 in the case of being mounted on the carriage 118. The printing chip 122 comprises a printing chip 122a on which a plurality of nozzles ejecting Bk ink are arrayed and a printing chip 122b on which pluralities of nozzles ejecting C ink, M ink, and Y ink, respectively, are arrayed (see FIG. 2B).

Figure 2A:
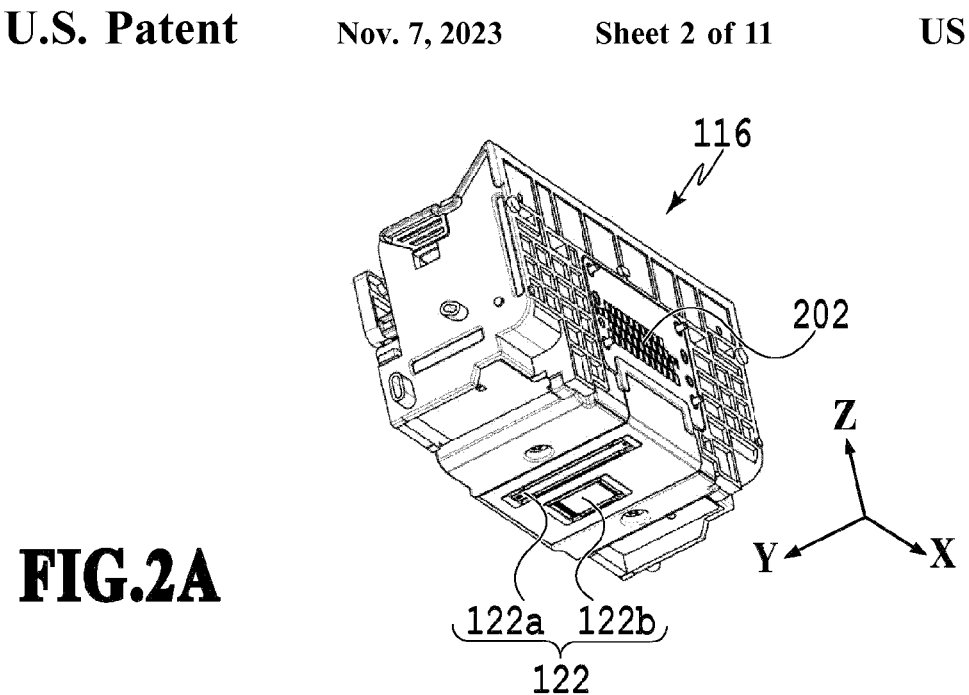
FIGS. 2A to 2D are diagrams illustrating the configuration of a print head.
Figure 2B:
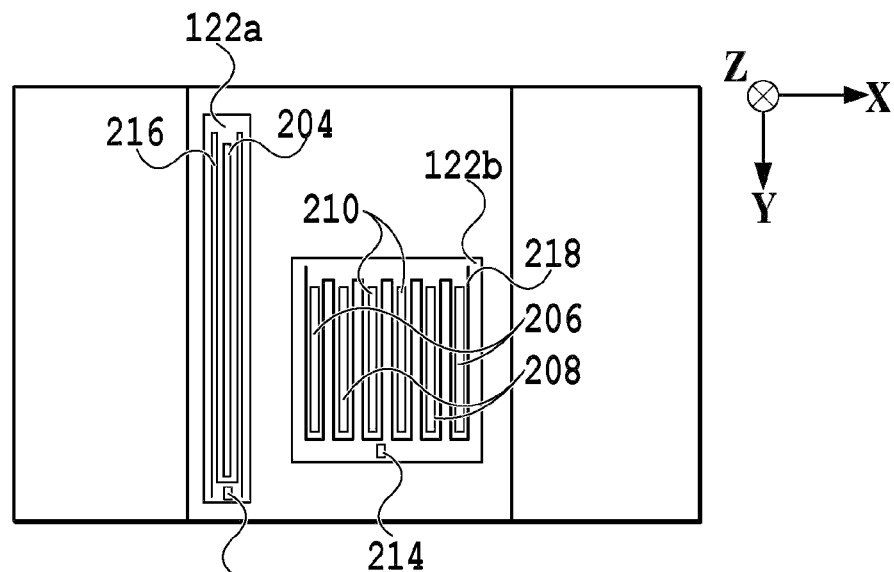
Figures 2C, 2D:
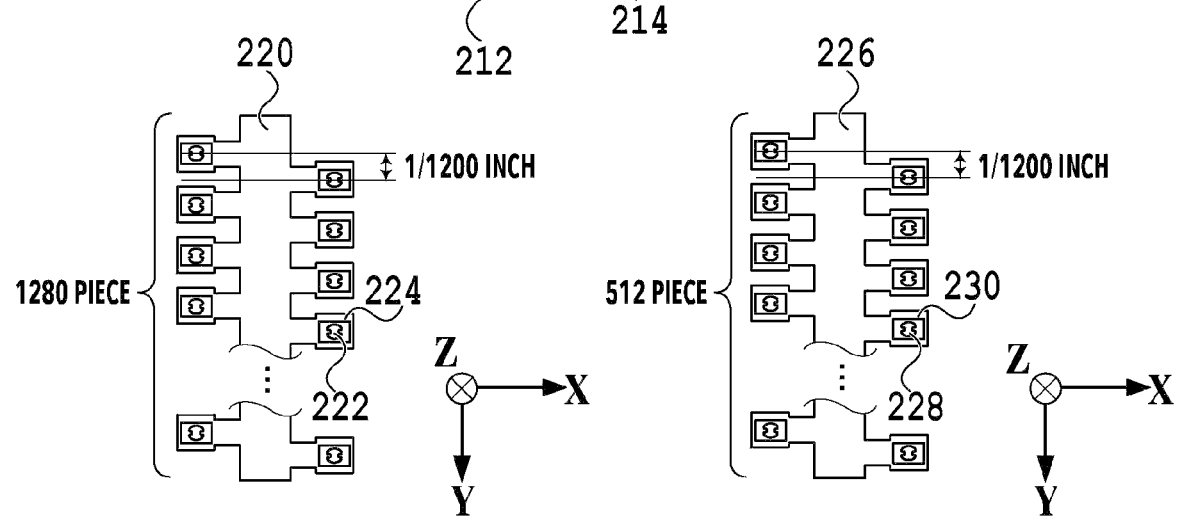

The configuration of the print head 116 will be described with reference to FIGS. 2A to 2D. FIG. 2A is a perspective configuration diagram of the print head 116. FIG. 2B is a diagram of a chip surface of the print head 116 on which the printing chip 122 is provided. FIG. 2C is a diagram showing a nozzle array on the printing chip 122a. FIG. 2D is a diagram showing each nozzle array on the printing chip 122b.

The print head 116 receives a printing signal from the printing apparatus 100 body via a contact pad 202 and is supplied with power necessary for driving the print head 116.

The printing chip 122a has a nozzle array 204 formed by arraying a plurality of nozzles for ejecting Bk ink in the Y direction. The printing chip 122b has a nozzle array 206 formed by arraying a plurality of nozzles for ejecting C ink in the Y direction. The printing chip 122b also has a nozzle array 208 formed by arraying a plurality of nozzles for ejecting M ink in the Y direction. The printing chip 122b further has a nozzle array 210 formed by arraying a plurality of nozzles for ejecting Y ink in the Y direction.

The printing chip 122a comprises at one end of the nozzle array 204 in the Y direction a diode sensor (Di sensor) 212 which detects the temperature of the print head 116. The printing chip 122b also comprises at one end of the nozzle array 210 in the Y direction a Di sensor 214 which detects the temperature of the print head 116. The Di sensors 212 and 214 are located on the downstream sides of the printing chips 122a and 122b in the conveying direction of a printing medium S.

The printing chips 122a and 122b comprise sub-heaters 216 and 218, respectively, for ink heating. The sub-heaters 216 and 218 heat or do not heat the print head substrate depending on whether to apply a voltage.

As shown in FIG. 2C, in the nozzle array 204 of the printing chip 122a, ejection openings 222 for ejecting ink are formed on both sides of a liquid chamber 220 extending in the Y direction. A heater 224 for ink ejection is provided at a position corresponding to each ejection opening 222, which is directly below each ejection opening 222 (+Z direction side) in the present embodiment. The nozzle array 204 has 1280 ejection openings 222. As shown in FIG. 2D, in each of the nozzle arrays 206, 208, and 210 of the printing chip 122b, ejection openings 228 for ejecting ink are formed on both sides of a liquid chamber 226 extending in the Y direction. A heater 230 for ink ejection is provided at a position corresponding to each ejection opening 228, which is directly below each ejection opening 228 in the present embodiment. Each of the nozzle arrays 206, 208, and 210 has 512 ejection openings 228.

The heaters 224 and 230 generate heat by voltage application, produce bubbles in ink inside the liquid chambers 220 and 226, respectively, and eject ink from corresponding nozzles. In the nozzle arrays 204, 206, 208, and 210, serial numbers such as 0, 1, 2, . . . are sequentially assigned from the position where the Di sensors 212 and 214 are located toward the −Y direction side. An interval between the ejection openings 222 of the nozzle array 204 and an interval between the ejection openings 228 of the nozzle arrays 206, 208, and 210 are each 1/1200 inch. Accordingly, in the nozzle arrays 204, 206, 208, and 210, nozzles are formed by the ejection openings 222 and 228, the heaters 224 and 230, and the like as the feature for ejecting ink from the ejection openings 222 and 228.

Figure 3:
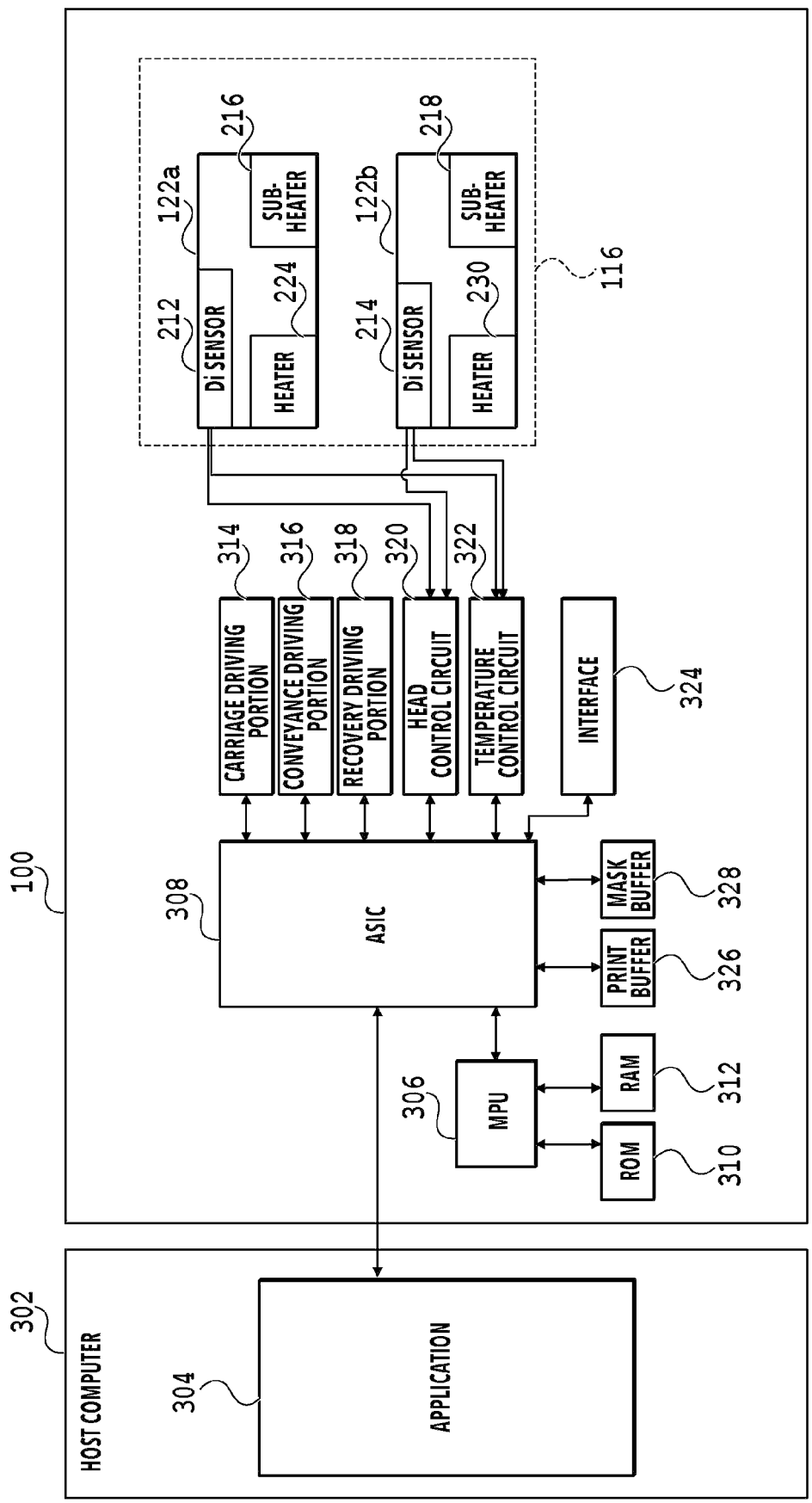
FIG. 3 is a block configuration diagram of a printing control system of the printing apparatus.

Next, the configuration of a printing control system of the printing apparatus 100 will be described. FIG. 3 is a block diagram showing the configuration of the printing control system of the printing apparatus 100. The printing apparatus 100 is connected to a host computer 302. The host computer 302 transmits, to the printing apparatus 100, bitmap multivalued image data which is stored in various storage media (not shown) such as a hard disk and a memory and has pixels each having a value of three channels R, G, and B (e.g., 0 to 255). In the present embodiment, the host computer 302 uses an application 304 to transmit the multivalued image data to the printing apparatus 100. For example, the host computer 302 may output, to the printing apparatus 100, multivalued image data input from an external apparatus such as a scanner or digital camera after processing the multivalued image data with the application 304.

The printing apparatus 100 uses an MPU 306, an ASIC 308, and the like to perform image processing for image data input from the host computer 302. Specifically, the input multivalued image data is subjected to binarization processing or masking processing in the MPU 306, ASIC 308, or the like. In this manner, the printing apparatus 100 generates binary bitmap print data indicating ink ejection/non-ejection from the print head 116 for each pixel.

The printing apparatus 100 prints an image by ejecting ink from the print head 116 to a printing medium S based on the generated print data. The printing apparatus 100 is controlled by the MPU 306 according to a program stored in the ROM 310. A RAM 312 functions as a work area or a temporary data storage area for the MPU 306.

The MPU 306 controls, via the ASIC 308, a carriage driving portion 314 for driving the carriage 118 and a conveyance driving portion 316 for driving the conveying roller 106 and the discharging roller 112 in the conveying portion 102. The MPU 306 also controls, via the ASIC 308, a recovery driving portion 318 which controls features performing recovery processing for the print head 116. The MPU 306 further controls, via the ASIC 308, a head control circuit 320 for driving the print head 116, a temperature control circuit 322 for controlling the temperature of the print head 116, and an interface 324.

The features performing recovery processing are features for maintaining/recovering a good state of ink ejection from the ejection openings 222 and 228. Specifically, publicly known features such as a cap which protects the chip surface of the print head 116 on which the printing chip 122 is provided, a suction apparatus which decompresses the inside of the cap and forces ink out of the nozzles, and a wiper which wipes the chip surface can be used. The recovery driving portion 318 is a driving portion which drives these features and may comprise a driving system such as a motor for each feature or a driving system shared among the features.

The generated print data is temporarily stored in a print buffer 326 connected to the ASIC 308. The ASIC 308 is also connected to a mask buffer 328. The mask buffer 328 temporarily stores a plurality of mask patterns applied in the case of transferring print data to the print head 116. The stored mask patterns are used in the case of executing a print mode in which printing is performed by a so-called multi-pass printing method of performing ejection accompanied with a plurality of scans of a unit printing area of a printing medium S by the print head 116, or in the case of executing divisional control. Various mask patterns storable in the mask buffer 328 are prestored in the ROM 310. In actual printing, corresponding mask patterns are read from the ROM 310 and stored in the mask buffer 328.

In the present embodiment, it is assumed that the printing apparatus 100 can perform printing on a printing medium S of up to A4 size (8.27 inch×11.69 inch) and a print resolution in the X direction is 600 dpi. Further, in the present embodiment, a printing rate in the case of arranging two dots in a square of a 600 dpi×600 dpi grid is defined as 100% duty. In the case of the print head 116, since a nozzle resolution in the Y direction is 1200 dpi, 100% duty is achieved if one nozzle arranges one dot in a square of a 600 dpi×600 dpi grid.

The temperature control circuit 322 determines a driving condition of the sub-heaters 216 and 218 of the printing chip 122 based on output values of the Di sensors 212 and 214 which detect the temperature of the print head 116. The head control circuit 320 then drives the sub-heaters 216 and 218 based on the determined driving condition. The head control circuit 320 also drives the heaters 224 and 230 in the print head 116.

The head control circuit 320 drives the sub-heaters 216 and 218 and the heaters 224 and 230, thereby performing head temperature adjustment and the like for preliminary discharging, ink ejection, and temperature adjustment in the print head 116. A program for temperature control is stored in the ROM 310 for example. By such a program, the head control circuit 320 and the temperature control circuit 322 detect the temperature of the print head 116, drive the sub-heaters 216 and 218, and the like. Further, depending on the temperature of the print head 116, the head control circuit 320 performs PWM control by driving the heaters 224 and 230 using a driving signal (driving pulse) including a pre-pulse and a main-pulse.

Figure 4:
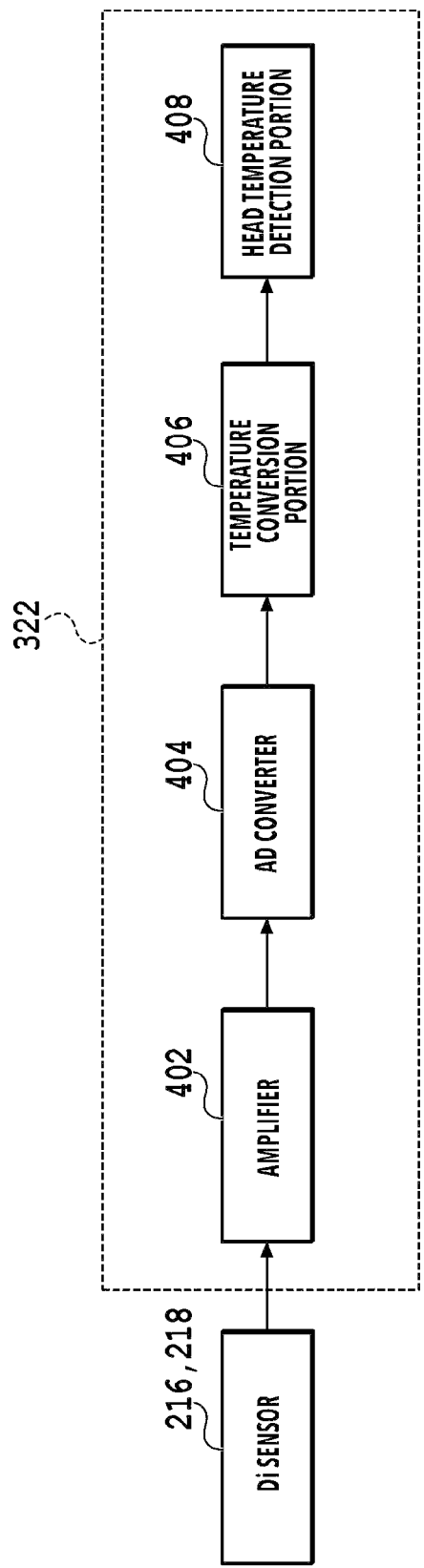
FIG. 4 is a diagram showing a flow of temperature detection in a temperature control circuit.

Next, a flow of temperature detection of the print head 116 in the temperature control circuit 322 will be described. FIG. 4 is a diagram showing the flow of temperature detection in the temperature control circuit 322. If a voltage based on the temperature of the print head 116 is input from the Di sensors 212 and 214 of the print head 116 to the temperature control circuit 322, the input voltage value is first amplified by an amplifier 402. The voltage value amplified by the amplifier 402 is digitized by an analog-to-digital converter (AD converter) 404. A voltage value ADdi from the Di sensors 212 and 214 digitized by the AD converter 404 is converted into a temperature Th by a temperature conversion portion 406. The temperature conversion portion 406 uses an ADdi-temperature conversion formula stored in the ROM 310 to convert the voltage value ADdi into the temperature Th. The converted temperature Th is output to a head temperature detection portion 408.

A description will be given of the case of performing printing on a printing medium using the printing apparatus 100 described above. If an instruction to start printing is input from the host computer 302, an operation portion (not shown) provided in the printing apparatus 100, or the like, the printing apparatus 100 starts printing processing to perform printing on a printing medium S. In the present embodiment, a unit printing area is an area corresponding to the length of the nozzle array in the array direction on the printing chip 122 printable by a single scan by the print head 116 in the X direction.

Figure 5:
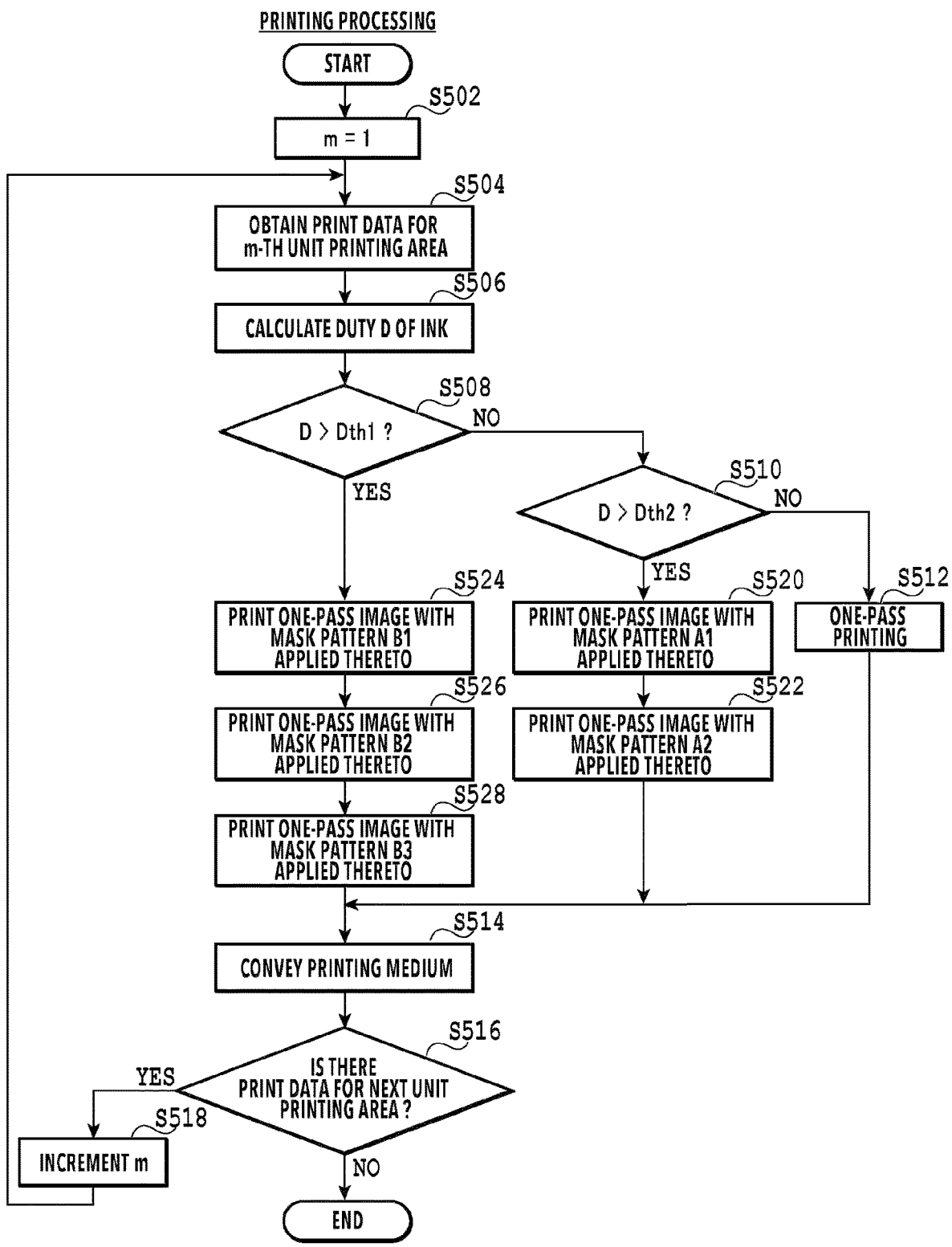
FIG. 5 is a detailed flowchart of printing processing.

FIG. 5 is a flowchart showing detailed processing contents of printing processing executed by the printing apparatus according to the present embodiment. The procedure shown in the flowchart of FIG. 5 is performed by the MPU 306 loading a program code stored in the ROM 310 into the RAM 312 and executing the program code. Alternatively, some or all functions of the steps in FIG. 5 may be executed by hardware such as an ASIC or electric circuit. It should be noted that sign S in the description of processing indicates a step in the flowchart.

In the printing processing shown in the flowchart of FIG. 5, normal printing and printing by divisional control are selectively executed according to a duty of printing of a unit printing area. In the present embodiment, the printing apparatus 100 performs printing on a printing medium by bidirectional printing in which printing is performed in a forward scan and a backward scan in the scan direction of the print head 116. The normal printing is one-pass printing in which a unit printing area is printed by a single scan accompanied with printing. The printing by divisional control is multipass printing in which a unit printing area is printed by an even number of scans or an odd number of scans equal to or greater than three scans accompanied with printing. In the present embodiment, the printing by divisional control is two-pass printing in which a unit printing area is printed by two scans accompanied with printing or three-pass printing in which a unit printing area is printed by three scans accompanied with printing. Further, in the present embodiment, since the same processing is executed for the printing chips 122a and 122b, a description will be given of processing in the printing chip 122a.

If printing processing is started, the MPU 306 first sets a variable m indicating a unit printing area to be printed at 1 (S502) and obtains print data for the m-th unit printing area (S504). The MPU 306 then counts the number of Bk ink dots and an image width W (width in the X direction) from the obtained print data and calculates a duty D of Bk ink by dividing the number of dots by the image width W (S506). In this manner, in the present embodiment, the MPU 306 functions as an obtaining portion which obtains information about the amount of ink ejected to a unit printing area.

Next, the MPU 306 determines whether the calculated duty D is greater than a threshold Dth1 (S508). The threshold Dth1 is a value used to determine whether to perform three-pass printing, namely printing by three-division control and is prestored in the ROM 310. For example, the threshold Dth1 is set at a duty value at which the amount of head temperature rise in two-pass printing by the printing chip 122a is equal to or less than a first value. The first value may be an upper limit value of a duty value at which ink can be stably ejected from the ejection opening 222 by the heater 224 in two-pass printing, or may be a value less than the upper limit value by a predetermined amount. The duty value set as the threshold Dth1 may be set based on a different requirement. For example, the threshold Dth1 may be set at an upper limit value of a duty value at which the printing chip 122a can print a unit printing area by two passes or a value less than the upper limit value by a predetermined amount according to the supply capability of a power source (not shown) of the printing apparatus 100 or the like.

If it is determined in S508 that the duty D is not greater than the threshold Dth1, that is, equal to or less than the threshold, it is determined that the duty is not for three-pass printing and the MPU 306 determines whether the duty D is greater than a threshold Dth2 (S510). The threshold Dth2 is a value used to determine whether to perform two-pass printing, namely printing by two-division control and is prestored in the ROM 310. For example, the threshold Dth2 is set at a duty value at which the amount of head temperature rise in one-pass printing by the printing chip 122a is equal to or less than a second value. The second value may be an upper limit value of a duty value at which ink can be stably ejected from the ejection opening 222 by the heater 224 in one-pass printing, or may be a value less than the upper limit value by a predetermined amount. The duty value set as the threshold Dth2 may be set based on a different requirement. For example, the threshold Dth2 may be set at an upper limit value of a duty value at which the printing chip 122a can print a unit printing area by one pass or a value less than the upper limit value by a predetermined amount according to the supply capability of the power source (not shown) of the printing apparatus 100. Accordingly, the threshold Dth2 is less than the threshold Dth1. The threshold Dth2 may be half the threshold Dth1 or the threshold Dth1 may be twice the threshold Dth2.

If it is determined in S510 that the duty D is not greater than the threshold Dth2, that is, equal to or less than the threshold, it is determined that there is no need for printing by divisional control and the MPU 306 performs normal printing (third mode) of the m-th unit printing area (S512). As described above, the normal printing is one-pass printing in which printing is performed by a single scan accompanied with printing. After the completion of printing of the m-th unit printing area by one-pass printing, the MPU 306 next conveys the printing medium S by a predetermined amount (S514) and determines whether there is print data for the next unit printing area (S516). If it is determined in S516 that there is print data for the next unit printing area, the MPU 306 increments m (S518) and returns to S504. If it is determined in S516 that there is no print data for the next unit printing area, the printing processing is finished.

The predetermined amount, which is the amount of conveyance of the printing medium S in S514, is set at an amount corresponding to the length of the nozzle array 204 in the array direction (Y direction). Alternatively, the predetermined amount may be a value obtained by correcting the amount corresponding to the above length according to the properties of the conveying portion 102 of the printing apparatus 100 or a value obtained by correcting the amount corresponding to the above length in consideration of the ejection properties of the nozzle array 204.

If it is determined in S510 that the duty D is greater than the threshold Dth2, it is determined that there is the need for two-pass printing (first mode), the processing proceeds to S520 to be described later, and two-pass printing is performed using mask patterns A1 and A2. Various mask patterns including the mask patterns A1 and A2 and mask patterns described later are prestored in the ROM 310. Mask patterns to be used in actual printing are read from the ROM 310 and stored in the mask buffer 328.

Figures 6A, 6B, 6C:
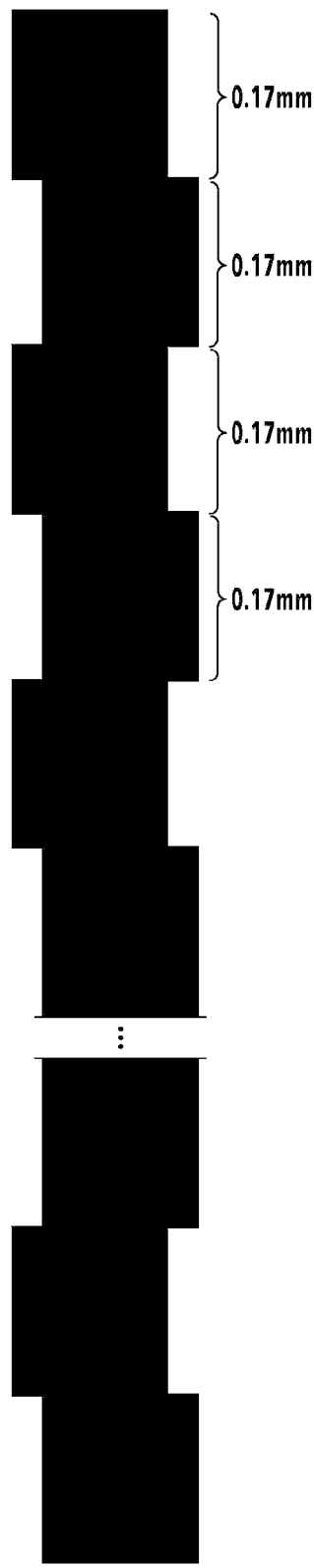
FIGS. 6A to 6C are diagrams showing mask patterns used for two-pass printing and a printed image.

The mask patterns A1 and A2 used for two-pass printing will be described below. FIG. 6A is a diagram showing the mask pattern A1 and FIG. 6B is a diagram showing the mask pattern A2. FIG. 6C is a conceptual diagram of an image printed in a case where misalignment occurs between ink landing positions in forward printing and those in backward printing in two-pass printing of a 100% duty solid image using the mask patterns A1 and A2. In the illustrated mask patterns A1 and A2, the pixels arrayed in the Y direction (vertical direction in the drawings) correspond to the respective nozzles in the nozzle array 204. Although each pattern has only a single pixel in the X direction (horizontal direction in the drawings), the pattern is used by being repeated the number of times corresponding to the image width Win the X direction in the present embodiment.

In the illustrated mask patterns A1 and A2, a blacked out portion indicates an area to which ink is ejected. In the mask patterns A1 and A2, eight continuous nozzles are treated as one block and ink ejection/non-ejection areas are set in units of blocks. Each of the mask patterns A1 and A2 is divided into block 1 to block 160. In the mask pattern A1, odd-numbered blocks, that is, blocks 1, 3, 5, ... 159 are ejection areas and even-numbered blocks are non-ejection areas. In the mask pattern A2, even-numbered blocks, that is, blocks 2, 4, 6, ... 160 are ejection areas and odd-numbered blocks are non-ejection areas. The entire unit printing area can be printed by combining the mask patterns A1 and A2.

Returning to FIG. 5, in two-pass printing, in S520, the MPU 306 first uses the print data obtained in S504 and the mask pattern A1 to print an image (one-pass image) of a unit printing area with the mask pattern A1 applied thereto while moving the print head 116, for example, in the forward direction. After that, the MPU 306 uses the print data obtained in S504 and the mask pattern A2 to print the one-pass image with the mask pattern A2 applied thereto while moving the print head 116 in the backward direction opposite to the scan direction in S520 (S522), and proceeds to S514. In this manner, in two-pass printing, one unit printing area is printed while moving in different directions in S520 and S522.

In the above description of two-pass printing, in order to facilitate understanding, the print head 116 performs a scan in the forward direction in the printing in S520 and in the backward direction opposite to the scan direction in S520 in the printing in S522. However, the scan directions are not limited to this example. That is, in a case where printing of the (m−1)th unit printing area has been finished by printing by the print head 116 moving in the forward direction, printing is performed in S520 while the print head 116 is performing a scan in the backward direction and printing is performed in S522 while the print head 116 is performing a scan in the forward direction.

Figures 7A, 7B, 7C, 7D:
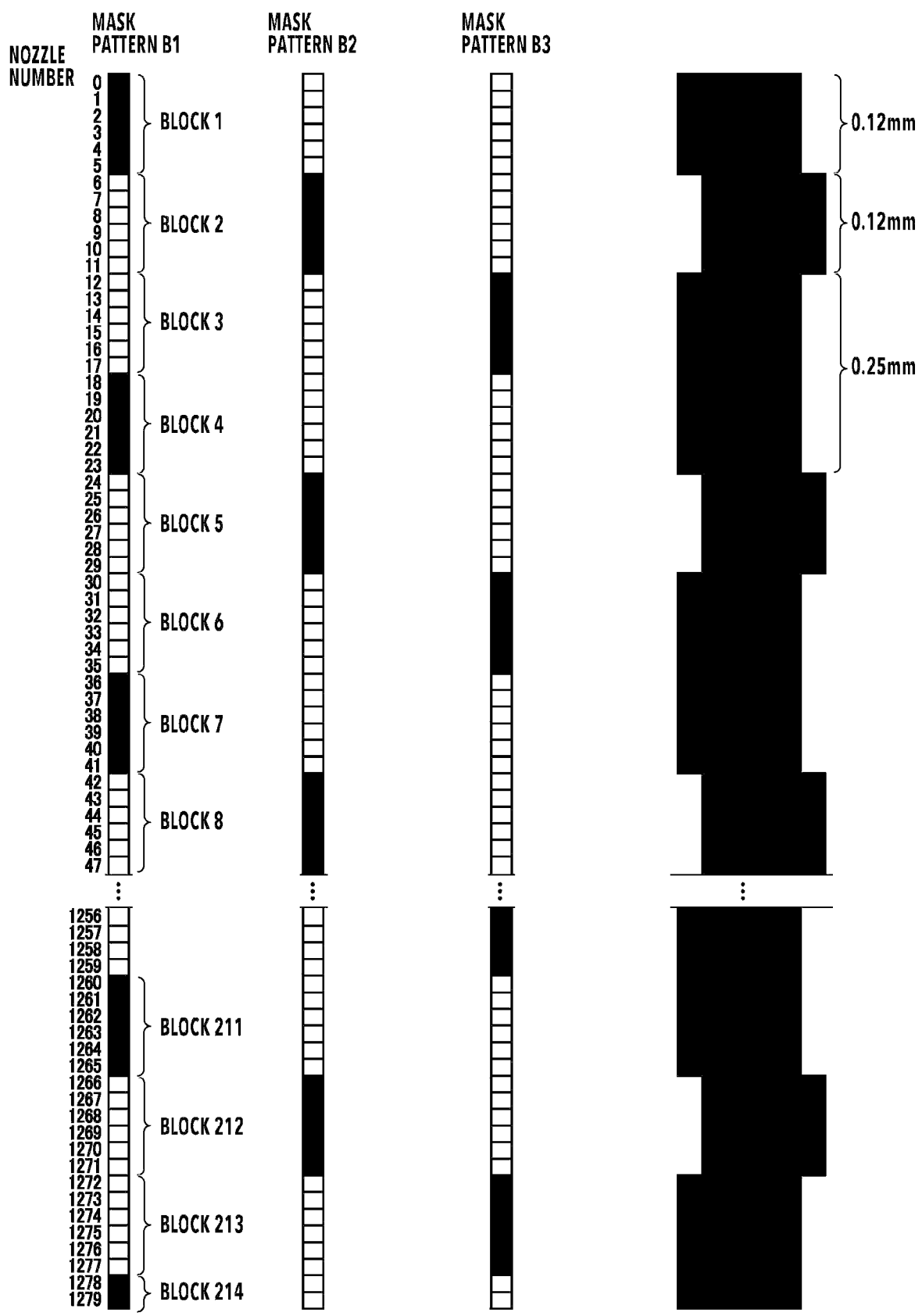
FIGS. 7A to 7D are diagrams showing mask patterns used for three-pass printing and a printed image.

If it is determined in S508 that the duty D is greater than the threshold Dth1, it is determined that there is the need for three-pass printing (second mode), the processing proceeds to S524 to be described later, and three-pass printing is performed using mask patterns B1, B2, and B3. The mask patterns B1, B2, and B3 used for three-pass printing will be described below. FIG. 7A is a diagram showing the mask pattern B1, FIG. 7B is a diagram showing the mask pattern B2, and FIG. 7C is a diagram showing the mask pattern B3. FIG. 7D is a conceptual diagram of an image printed in a case where misalignment occurs between ink landing positions in forward printing and those in backward printing in three-pass printing of a 100% duty solid image using the mask patterns B1, B2, and B3. Like the mask patterns A1 and A2, each of the illustrated mask patterns B1, B2, and B3 has pixels corresponding to the respective nozzles of the nozzle array 204 and is used by being repeated the number of times corresponding to the image width W in the X direction.

In the illustrated mask patterns B1, B2, and B3, a blacked out portion indicates an area to which ink is ejected. In the mask patterns B1, B2, and B3, six continuous nozzles are treated as one block and ink ejection/non-ejection areas are set in units of blocks. Each of the mask patterns B1, B2, and B3 is divided into block 1 to block 214. Although block 214 does not have six nozzles, it is treated as one block for the sake of convenience. That is, the number of nozzles in one block of the mask patterns B1, B2, and B3 used for three-pass printing is less than the number of nozzles in one block of the mask patterns A1 and A2 used for two-pass printing. In other words, the width in the Y direction of one block (hereinafter also simply referred to as "block width") of the mask patterns used for three-pass printing is less than the block width of the mask patterns used for two-pass printing.

In the mask pattern B1, blocks 1, 4, 7, . . . 211, 214 are ejection areas and the other blocks are non-ejection areas. That is, in the mask pattern B1, an ejection area is formed from block 1 at intervals of two blocks, namely every three blocks. In the mask pattern B2, blocks 2, 5, 8, . . . 212 are ejection areas and the other blocks are non-ejection areas. That is, in the mask pattern B2, an ejection area is formed from block 2 at intervals of two blocks. In the mask pattern B3, blocks 3, 6, 9, . . . 213 are ejection areas and the other blocks are non-ejection areas. That is, in the mask pattern B3, an ejection area is formed from block 3 at intervals of two blocks. The entire unit printing area can be printed by combining the mask patterns B1, B2, and B3.

Returning to FIG. 5, in three-pass printing, in S524, the MPU 306 first uses the print data obtained in S504 and the mask pattern B1 to print the one-pass image with the mask pattern B1 applied thereto while moving the print head 116, for example, in the forward direction. Next, the MPU 306 uses the print data obtained in S504 and the mask pattern B2 to print the one-pass image with the mask pattern B2 applied thereto while moving the print head 116 in the backward direction opposite to the scan direction in S524 (S526). After that, the MPU 306 uses the print data obtained in S504 and the mask pattern B3 to print the one-pass image with the mask pattern B3 applied thereto while moving the print head 116 in the forward direction opposite to the scan direction in S526 (S528) and proceeds to S514. In this manner, in three-pass printing, one unit printing area is printed by three scans in S524, S526, and S528, where the scan direction of the print head 116 in S526 is opposite to that in S524 and S528.

In the above description of three-pass printing, in order to facilitate understanding, the print head 116 performs a scan in the forward direction in printing in the first pass of the three-pass printing, in the backward direction in printing in the second pass, and in the forward direction in printing in the third pass. However, the scan directions of the print head 116 in three-pass printing are not limited to this example. That is, in a case where printing of the (m−1)th unit printing area has been finished by printing by the print head 116 performing a scan in the forward direction, printing is performed while moving the print head 116 in the backward direction in the first pass, namely in S524. In the second pass, namely in S526, printing is performed while moving the print head 116 in the forward direction. In the third pass, namely in S528, printing is performed while moving the print head 116 in the backward direction. In the present embodiment, the MPU 306 functions as a control portion capable of selecting either two-pass printing or three-pass printing and controlling the print head 116 to print a unit printing area by alternately performing a forward scan accompanied with printing and a backward scan accompanied with printing based on the selection.

As described above, in the present embodiment, the number of nozzles in one block of the mask patterns used for three-pass printing, for which an ink ejection or non-ejection area is set, is less than the number of nozzles in one block of the mask patterns used for two-pass printing. The advantageous result produced by the number of nozzles in one block for three-pass printing less than the number of nozzles in one block for two-pass printing will be described below with reference to FIGS. 6C, 7C, and 8A to 8D. FIGS. 8A to 8D are diagrams showing mask patterns and a printed image of a comparative example in which the number of nozzles in one block for three-pass printing is equal to the number of nozzles in one block for two-pass printing. FIG. 8A is a diagram showing a mask pattern D1 used in the comparative example, FIG. 8B is a diagram showing a mask pattern D2 used in the comparative example, and FIG. 8C is a diagram showing a mask pattern D3 used in the comparative example. FIG. 8D is a conceptual diagram of an image printed in a case where misalignment occurs between ink landing positions in forward printing and those in backward printing in three-pass printing of a 100% duty solid image using the mask patterns D1, D2, and D3.

Like the mask patterns A1 and A2, each of the illustrated mask patterns D1, D2, and D3 has pixels corresponding to the respective nozzles of the nozzle array 204 and is used by being repeated the number of times corresponding to the image width W in the X direction. Specifically, each of the mask patterns D1, D2, and D3 is divided into block 1 to block 160. In the mask pattern D1, an ejection area is formed from block 1 at intervals of two blocks. In the mask pattern D2, an ejection area is formed from block 2 at intervals of two blocks. In the mask pattern D3, an ejection area is formed from block 3 at intervals of two blocks. The entire unit printing area can be printed by combining the mask patterns D1, D2, and D3.

In two-pass printing, as shown in FIG. 6C, misalignment between ink landing positions in forward printing and those in backward printing (hereinafter also simply referred to as "landing misalignment") occurs in units of $8 \times (\frac{1}{1200} \text{ dpi}) \approx 0.17$ mm in the Y direction. On the other hand, the printed image is as shown in FIG. 8D in the comparative example, in which three-pass printing is performed using the mask patterns D1, D2, and D3 having the number of pixels (number of nozzles) in one block equal to that in two-pass printing. That is, landing misalignment of $8 \times 2 \times (\frac{1}{1200} \text{ dpi}) \approx 0.34$ mm occurs in the Y direction in a portion for which printing has been continuously performed in the same direction. In this landing-misaligned portion, the landing misalignment is seen in twice the length in two-pass printing in the Y direction.

In contrast, the printed image is as shown in FIG. 7D in the present embodiment, in which printing is performed using the mask patterns B1, B2, and B3 having the number of pixels in one block less than that in two-pass printing. That is, landing misalignment of $6 \times 2 \times (\frac{1}{1200} \text{ dpi}) \approx 0.25$ mm occurs in the Y direction in a portion for which printing has been continuously performed in the same direction. In other words, an image obtained by three-pass printing of the present embodiment includes both the landing misalignment of $6 \times (\frac{1}{1200} \text{ dpi}) \approx 0.12$ mm and the landing misalignment of 0.25 mm in the Y direction. These values of landing misalignment are less than the values of landing misalignment in the comparative example (0.17 mm, 0.34 mm). Accordingly, the visibility of landing misalignment is reduced, that is, the landing misalignment becomes difficult to see.

Further, in the case of performing printing by divisional control, the concentration of a printed image generally increases if the block width is reduced to a certain extent. This is because ink that has landed on and penetrated into a printing medium in printing in the first scan of the printing by divisional control has the influence on ink landing on the printing medium in printing from the second scan onward so as to change the state of penetration of the ink into the printing medium. As a result, color unevenness occurs in a portion in which an area printed by a single scan is adjacent to an area printed by two or more scans. According to the findings of the present invention, it is known that the above color unevenness in three-pass printing is less than that in two-pass printing even if the block width is the same.

In consideration of the above, in the present embodiment, one block has eight nozzles in two-pass printing and six nozzles in three-pass printing to reduce the visibility of both the landing misalignment and the color unevenness. However, the number of nozzles in one block in two-pass printing and that in three-pass printing are not limited to eight (first number) and six (second number), respectively. That is, the number of nozzles in one block in two-pass printing and the number of nozzles in one block in three-pass printing may be calculated and determined, for example, empirically according to the types of ink and printing medium and their combinations.

It is preferable that the number of nozzles (number of pixels) in one block in printing by an odd number of passes be equal to or greater than half the number of nozzles in one block in printing by an even number of passes. If the number of nozzles in one block in printing by an odd number of passes is less than half the number of nozzles in one block in printing by an even number of passes, the maximum value of a unit of landing misalignment in printing by an odd number of passes is less than a unit of landing misalignment in printing by an even number of passes. This reduces the visibility of landing misalignment but increases the possibility of occurrence of color unevenness. In addition, the total number of blocks in printing by an even number of passes is set such that it is greater than the number of passes in the printing by an even number of passes. The total number of blocks in printing by an odd number of passes is also set such that it is greater than the number of passes in the printing by an odd number of passes. In short, the nozzle array is divided into three or more blocks in two-pass printing and four or more blocks in three-pass printing.

In the present embodiment, two-pass printing and three-pass printing are selectively executed as divisional control in order to suppress the increase in printing time. However, the divisional control is not limited to this. For example, in a case where the regulation for printing time is relaxed, the printing by an even number of passes may be printing accompanied with four or more passes and the printing by an odd number of passes may be printing accompanied with five or more passes.

As described above, according to the above embodiment, in printing processing for performing printing on a printing medium, it is determined whether to perform divisional control to print a unit printing area and how many scans are performed in the divisional control. In the divisional control, the number of nozzles in one block of the mask patterns used for three-pass printing is less than the number of nozzles in one block of the mask patterns used for two-pass printing. This makes it difficult to see landing misalignment in three-pass printing and suppresses the occurrence of an image defect in a printed subject.

Further, the number of nozzles in one block in three-pass printing is equal to or greater than half the number of nozzles in one block in two-pass printing. This suppresses the occurrence of color unevenness and thereby more reliably suppresses the occurrence of an image defect in a printed subject.

Second Embodiment

Figure 9B:
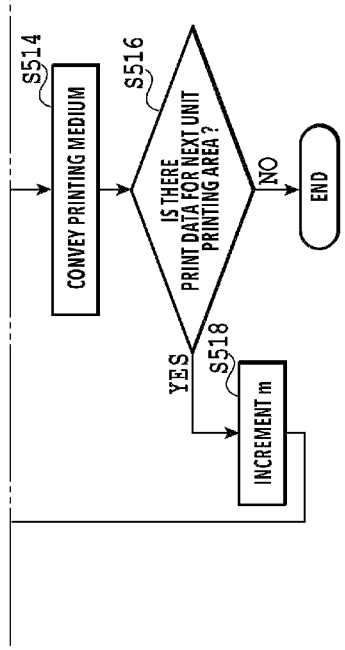
Figures 10A, 10B, 10C, 10D, 10E:
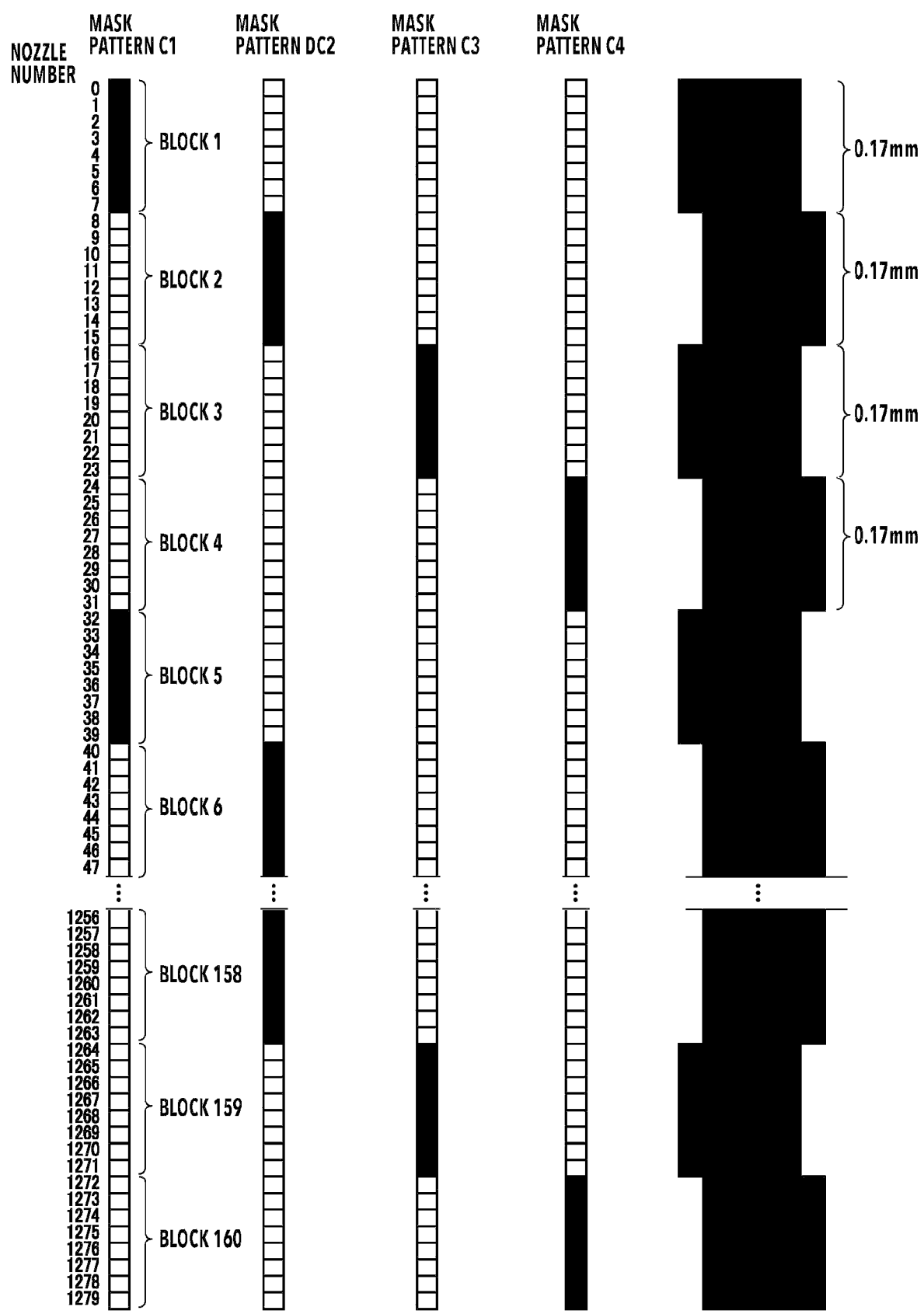
FIGS. 10A to 10E are diagrams showing mask patterns used for four-pass printing and a printed image.

Next, a printing apparatus according to a second embodiment will be described with reference to FIGS. 9 to 10E. It should be noted that the detailed description of features identical to or corresponding to those of the printing apparatus according to the first embodiment described above will be omitted below using the same reference signs as those used in the first embodiment.

The second embodiment is different from the first embodiment described above in that four-pass printing can be selectively executed as printing by divisional control in addition to two-pass printing and three-pass printing.

Printing processing executed by the printing apparatus according to the present embodiment will be described below in detail. FIGS. 9A and 9B are flowcharts showing detailed processing contents of the printing processing executed by the printing apparatus according to the second embodiment. The procedure shown in the flowchart of FIGS. 9A and 9B are performed by the MPU 306 loading a program code stored in the ROM 310 into the RAM 312 and executing the program code. Alternatively, some or all functions of the steps in FIGS. 9A and 9B may be executed by hardware such as an ASIC or electric circuit.

In the printing processing shown in the flowchart of FIGS. 9A and 9B, normal printing and printing by divisional control are selectively executed according to a print duty for a unit printing area. In the present embodiment, the printing by divisional control is two-pass printing, three-pass printing, or four-pass printing in which a unit printing area is printed by four scans accompanied with printing. Since the same printing processing is executed for the printing chips 122a and 122b also in the present embodiment, a description will be given of printing processing in the printing chip 122a. Further, the detailed description of steps having specific processing contents identical to those in the printing processing in the first embodiment described above will be omitted using the same step numbers.

If printing processing is started and a duty of Bk ink is calculated in S506, it is determined whether the calculated duty D is greater than a threshold Dth0 (S902). The threshold Dth0 is a value used to determine whether to perform four-pass printing, namely printing by four-division control and is prestored in the ROM 310. For example, the threshold Dth0 is set at a duty at which the amount of head temperature rise in three-pass printing by the printing chip 122a is equal to or less than a third value. The third value may be an upper limit value of a duty value at which ink can be stably ejected from the ejection opening 222 by the heater 224 in three-pass printing, or may be a value less than the upper limit value by a predetermined amount. The duty value set as the threshold Dth0 may be set based on a different requirement. For example, the threshold Dth0 may be set at an upper limit value of a duty value at which the printing chip 122a can print a unit printing area by three passes or a value less than the upper limit value by a predetermined amount according to the supply capability of the power source (not shown) of the printing apparatus 100 or the like.

If it is determined in S902 that the duty D is not greater than the threshold Dth0, that is, equal to or less than the threshold Dth0, it is determined that the duty is not for four-pass printing, the processing proceeds to S508, and the subsequent steps are executed. If it is determined in S902 that the duty D is greater than the threshold Dth0, it is determined that there is the need for four-pass printing, the processing proceeds to S904 to be described later, and four-pass printing is performed using mask patterns C1, C2, C3, and C4.

The mask patterns C1, C2, C3, and C4 used for four-pass printing will be described below. FIG. 10A is a diagram showing the mask pattern C1, FIG. 10B is a diagram showing the mask pattern C2, FIG. 10C is a diagram showing the mask pattern C3, and FIG. 10D is a diagram showing the mask pattern C4. FIG. 10E is a conceptual diagram of an image printed in a case where misalignment occurs between ink landing positions in forward printing and those in backward printing in four-pass printing of a 100% duty solid image using the mask patterns C1, C2, C3, and C4. Like the mask patterns A1 and A2, each of the illustrated mask patterns C1, C2, C3, and C4 has pixels corresponding to the respective nozzles of the nozzle array 204 and is used by being repeated the number of times corresponding to the image width W in the X direction.

In the illustrated mask patterns C1, C2, C3, and C4, a blacked out portion indicates an area to which ink is ejected. In the mask patterns C1, C2, C3, and C4, eight continuous nozzles are treated as one block and ink ejection/non-ejection areas are set in units of blocks. Each of the mask patterns C1, C2, C3, and C4 is divided into block 1 to block 160.

In the mask pattern C1, blocks 1, 5, . . . 157 are ejection areas and the other blocks are non-ejection areas. That is, in the mask pattern C1, an ejection area is formed from block 1 at intervals of three blocks, namely every four blocks. In the mask pattern C2, blocks 2, 6, . . . 158 are ejection areas and the other blocks are non-ejection areas. That is, in the mask pattern C2, an ejection area is formed from block 2 at intervals of three blocks. In the mask pattern C3, blocks 3, 7, . . . 159 are ejection areas and the other blocks are non-ejection areas. That is, in the mask pattern C3, an ejection area is formed from block 3 at intervals of three blocks. In the mask pattern C4, blocks 4, 8, . . . 160 are ejection areas and the other blocks are non-ejection areas. The entire unit printing area can be printed by combining the mask patterns C1, C2, C3, and C4.

Returning to FIG. 9A, in four-pass printing, in S904, the MPU 306 first uses the print data obtained in S504 and the mask pattern C1 to print the one-pass image with the mask pattern C1 applied thereto while moving the print head 116, for example, in the forward direction. Next, the MPU 306 uses the print data obtained in S504 and the mask pattern C2 to print the one-pass image with the mask pattern C2 applied thereto while moving the print head 116 in the backward direction opposite to the scan direction in S904 (S906). After that, the MPU 306 uses the print data obtained in S504 and the mask pattern C3 to print the one-pass image with the mask pattern C3 applied thereto while moving the print head 116 in the forward direction opposite to the scan direction in S906 (S908). The MPU 306 further uses the print data obtained in S504 and the mask pattern C4 to print the one-pass image with the mask pattern C4 applied thereto while moving the print head 116 in the backward direction opposite to the scan direction in S908 (S910) and proceeds to S514. In this manner, in four-pass printing, one unit printing area is printed by four scans in S904, S906, S908, and S910, where the scan direction of the print head 116 in S904 and S908 is different from that in S906 and S910.

In the above description of four-pass printing, in order to facilitate understanding, the print head 116 performs a scan in the forward direction in printing in the first pass of the four-pass printing, in the backward direction in printing in the second pass, in the forward direction in printing in the third pass, and in the backward direction in printing in the fourth pass. However, the scan directions of the print head 116 in four-pass printing are not limited to this example. That is, in a case where printing of the (m−1)th unit printing area has been finished by printing by the print head 116 performing a scan in the forward direction, printing is performed while moving the print head 116 in the backward direction in the first pass, namely in S904. In the second pass, namely in S906, printing is performed while moving the print head 116 in the forward direction. In the third pass, namely in S908, printing is performed while moving the print head 116 in the backward direction. In the fourth pass, namely in S910, printing is performed while moving the print head 116 in the forward direction.

As described above, in the present embodiment, the number of nozzles in one block of the mask patterns used for four-pass printing, for which an ink ejection or non-ejection area is set, is equal to that for two-pass printing. In the case of four-pass printing, as shown in FIG. 10E, landing misalignment between forward printing and backward printing occurs in units of 0.17 mm in the Y direction like two-pass printing. Since the number of nozzles in one block in four-pass printing is equal to that in two-pass printing, the visibility of landing misalignment is also substantially equal to that in two-pass printing. That is, it can be said that the number of nozzles in one block in three-pass printing in the present embodiment is less than the number of nozzles in one block in four-pass printing.

In the present embodiment, two-pass printing, three-pass printing, and four-pass printing are selectively executed as divisional control in order to suppress the increase in printing time. However, the divisional control is not limited to this. For example, in a case where the regulation for printing time is relaxed, the printing by an even number of passes with a less number of scans may be printing accompanied with four or more passes, the printing by an odd number of passes may be printing accompanied with five or more passes, and the printing by an even number of passes with a greater number of scans may be printing accompanied with six or more passes. In this case, the number of scans with an odd number of passes is between the two numbers of scans with an even number of passes and all the mask patterns used for the two types of printing by an even number of passes have the same number of nozzles in one block. Further, the number of nozzles in one block of mask patterns used for the printing by an odd number of passes is less than the number of nozzles in one block of the mask patterns used for the printing by an even number of passes. Further, in the case of suppressing color unevenness, the number of nozzles in one block of the mask patterns used for the printing by an odd number of passes is equal to or greater than half the number of nozzles in one block of the mask patterns used for the printing by an even number of passes.

As described above, according to the present embodiment, printing by an even number of passes and printing by an odd number of passes are selectively executed as divisional control. The number of nozzles in one block of the mask patterns used for the printing by an odd number of passes is less than the number of nozzles in one block of the mask patterns used for the printing by an even number of passes. Further, the number of nozzles in one block for the printing by an odd number of passes is equal to or greater than half the number of nozzles in one block for the printing by an even number of passes. As a result, the present embodiment produces the same advantageous result as that produced by the printing apparatus according to the first embodiment described above.

Other Embodiments

The above embodiments may be modified as stated in (1) to (5) below.

(1) In the above embodiments, in printing processing, the number of scans accompanied with printing at the time of printing a unit printing area is determined based on a duty of each color ink. However, the requirement for determination is not limited to a duty. That is, the above determination may be made based on the number of dots counted in S506, both the duty and the number of dots, or any information about the amount of ink ejected to a predetermined area.

(2) In the above embodiments, in printing processing, the number of dots is counted for the entire unit printing area. However, the target of counting is not limited to this. For example, the target may be each of areas obtained by dividing the unit printing area every predetermined pixels in the width direction of an image, or a predetermined area in each of these areas. This can reduce power consumption by the print head 116 having a time range shorter than a time require for one scan.

(3) In the above embodiments, a thermal method of ejecting ink using heaters has been described as the ink ejection method of the print head 116. However, the ejection method is not limited to the thermal method. For example, a piezoelectric method of ejecting ink using piezoelectric elements may be used as the ejection method.

(4) Although not particularly described in the above embodiments, a threshold used to determine the number of passes for a unit printing area of a printing medium, that is, the number of scans accompanied with printing for the unit printing area, may be different according to the type of printing medium S, information about printing quality, and the like.

(5) The above embodiments and various modifications shown in (1) to (4) above may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-217085, filed Dec. 25, 2020, which is hereby incorporated by reference wherein in its entirety.

What is claimed is:

1. A printing apparatus comprising:
a printing unit having a nozzle array in which a plurality of nozzles ejecting ink to a printing medium are arrayed, the printing unit being configured to perform printing while performing a scan in a direction crossing an array direction of the nozzle array; and
a control unit configured to control the printing unit such that the printing unit alternately executes a forward scan accompanied with printing in a scan direction of the printing unit and a backward scan accompanied with printing in the scan direction to print a unit printing area corresponding to a length of the nozzle array in the array direction printable by a single scan by the printing unit,
wherein the control unit selectively executes one of printing modes including a first mode in which the unit printing area is printed by an even number of scans accompanied with printing and a second mode in which the unit printing area is printed by an odd number of scans accompanied with printing, the odd number being three or more,
in the first mode, printing is performed using a first mask pattern in which the nozzle array is divided into a plurality of blocks each including a first number of continuous nozzles, the number of blocks being greater than the even number, and an ink ejection area or non-ejection area is set for each of the blocks, and
in the second mode, printing is performed using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

2. The printing apparatus according to claim 1, wherein the second number is equal to or greater than half the first number.

3. The printing apparatus according to claim 1, further comprising:
an obtaining unit configured to obtain information about the amount of ink ejected to a predetermined area in the unit printing area,
wherein the control unit selects the first mode or the second mode based on the information.

4. The printing apparatus according to claim 3, wherein
in a case where the odd number is greater than the even number,
the control unit selects the second mode if the information indicates a value greater than a first threshold, and
the control unit selects the first mode if the information indicates a value equal to or less than the first threshold and greater than a second threshold, the second threshold being less than the first threshold.

5. The printing apparatus according to claim 4, wherein if the information indicates a value equal to or less than the second threshold, the control unit selects a third mode in which the printing unit is controlled such that the unit printing area is printed by a single forward or backward scan by the printing unit.

6. The printing apparatus according to claim 5, wherein the first threshold is a value based on the information at which ink can be stably ejected from the nozzles in a case where printing is performed by the even number of scans by the printing unit, and the second threshold is a value based on information at which ink can be stably ejected from the nozzles in a case where printing is performed by a single scan by the printing unit.

7. The printing apparatus according to claim 3, wherein in a case where the odd number is less than the even number, the control unit selects the first mode if the information indicates a value greater than a third threshold, and the control unit selects the second mode if the information indicates a value equal to or less than the third threshold and greater than a fourth threshold, the fourth threshold being less than the third threshold.

8. The printing apparatus according to claim 7, wherein the third threshold is a value based on the information at which ink can be stably ejected from the nozzles in a case where printing is performed by the odd number of scans by the printing unit, and the fourth threshold is a value based on the information at which ink can be stably ejected from the nozzles in a case where printing is performed by the even number of scans by the printing unit.

9. The printing apparatus according to claim 3, wherein the predetermined area is identical to the unit printing area.

10. The printing apparatus according to claim 3, wherein the predetermined area is a plurality of areas obtained by dividing the unit printing area.

11. The printing apparatus according to claim 1, wherein the even number is two.

12. The printing apparatus according to claim 1, wherein the odd number is three.

13. The printing apparatus according to claim 1, wherein the first number is eight.

14. The printing apparatus according to claim 1, wherein the second number is six.

15. A control method of a printing apparatus, the control method comprising:

selectively executing one of printing modes including a first mode and a second mode, the first mode being a mode in which a unit printing area is printed by an even number of scans accompanied with printing by a printing unit, the printing unit having a nozzle array in which a plurality of nozzles ejecting ink are arrayed, the printing unit being configured to alternately execute an operation of printing while performing a forward scan in a scan direction crossing an array direction of the nozzle array and an operation of printing while performing a backward scan in the scan direction to print the unit printing area corresponding to a length of the nozzle array in the array direction printable by a single scan, the second mode being a mode in which the unit printing area is printed by an odd number of scans accompanied with printing by the printing unit, the odd number being three or more;

in the first mode, performing printing using a first mask pattern in which the nozzle array is divided into a plurality of blocks each including a first number of continuous nozzles, the number of blocks being greater than the even number, and an ink ejection area or non-ejection area is set for each of the blocks; and in the second mode, performing printing using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

16. A non-transitory computer readable storage medium storing a program for causing a computer to perform a control method of a printing apparatus, the control method comprising:

selectively executing one of printing modes including a first mode and a second mode, the first mode being a mode in which a unit printing area is printed by an even number of scans accompanied with printing by a printing unit, the printing unit having a nozzle array in which a plurality of nozzles ejecting ink are arrayed, the printing unit being configured to alternately execute an operation of printing while performing a forward scan in a scan direction crossing an array direction of the nozzle array and an operation of printing while performing a backward scan in the scan direction to print the unit printing area corresponding to a length of the nozzle array in the array direction printable by a single scan, the second mode being a mode in which the unit printing area is printed by an odd number of scans accompanied with printing by the printing unit, the odd number being three or more;

in the first mode, performing printing using a first mask pattern in which the nozzle array is divided into a plurality of blocks each including a first number of continuous nozzles, the number of blocks being greater than the even number, and an ink ejection area or non-ejection area is set for each of the blocks; and in the second mode, performing printing using a second mask pattern in which the nozzle array is divided into a plurality of blocks each including a second number of continuous nozzles, the second number being less than the first number, the number of blocks being greater than the odd number, and an ink ejection area or non-ejection area is set for each of the blocks.

* * * * *